Figure 1:
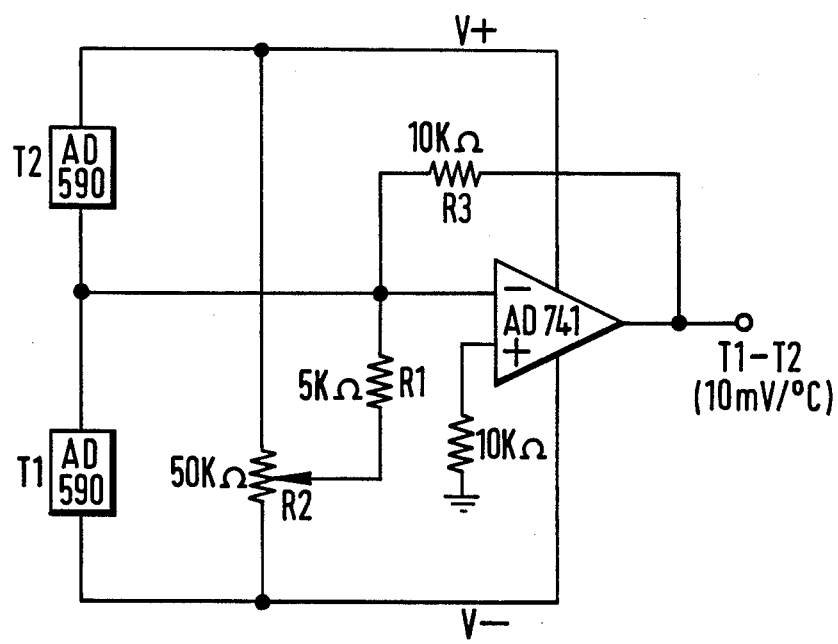

United States Patent [19]

Yates

[11] Patent Number: 4,781,064

[45] Date of Patent: Nov. 1, 1988

[54] PROTECTION FOR HYDRAULIC MACHINES

[76] Inventor: Maurice A. Yates, 4 Warren Park, Ottery-St-Mary, Devon EX11 1TN, United Kingdom

[21] Appl. No.: 946,126

[22] Filed: Dec. 24, 1986

Related U.S. Application Data

[63] Continuation of Ser. No. 716,105, Mar. 26, 1985, abandoned.

[30] Foreign Application Priority Data

Mar. 26, 1984 [GB] United Kingdom ............... 8407740

[51] Int. Cl.$^4$ .......................................... G01M 19/00
[52] U.S. Cl. ..................................... 73/168; 374/112; 417/32
[58] Field of Search .................. 73/168, 112; 374/112, 374/113, 114; 62/129; 417/32, 63

[56] References Cited

U.S. PATENT DOCUMENTS

| | | | |
|---|---|---|---|
| 1,522,273 | 1/1925 | Rissmann | 374/112 |
| 2,040,086 | 5/1936 | Goodwillie | 73/112 |
| 3,225,591 | 12/1965 | Orkney, Jr. et al. | 73/168 |
| 3,232,519 | 2/1966 | Long | 417/32 |
| 3,582,928 | 6/1971 | Gaertner | 340/522 |
| 3,699,810 | 10/1972 | Takahashi | 73/168 |
| 3,707,851 | 1/1973 | McAshau, Jr. | 62/129 |
| 3,918,300 | 11/1975 | Weissrich et al. | 73/112 |
| 3,921,435 | 11/1975 | Howard | 73/168 |
| 4,220,010 | 9/1980 | Mueller et al. | 417/32 |
| 4,249,697 | 2/1981 | Savage, Jr. | 374/112 |
| 4,265,091 | 5/1981 | Kobayashi | 62/129 |
| 4,328,678 | 5/1982 | Kono et al. | 417/32 |
| 4,336,001 | 6/1982 | Andrew et al. | 417/63 |
| 4,510,576 | 4/1985 | MacArthur | 73/112 |
| 4,549,403 | 10/1985 | Lord et al. | 62/209 |

FOREIGN PATENT DOCUMENTS

1403467 10/1969 Fed. Rep. of Germany .
1407740 9/1975 United Kingdom .

OTHER PUBLICATIONS

"Thermodynamische Wirkungsgradmessung an Hydroaggregaten im Einbauzustand" 82 Olhydraulik und Pneumatik vol. 24, Nr. 6, Jun. 1980.

"Thermometric Method of Measuring Hydraulic Efficiency" by T. R. Foord et al., Water Power, Oct. 1964, pp. 432–434.

"Efficiency Measurements for Hydraulic Turbines by the Poirson Thermometric Method" by G. Willm & P. Campmas, La Houille Blanche, Supplement Au No. 6/1956.

"Methode Thermometrique de Mesure du Rendement des Turbines Hydrauliques", Revue Generale De L'Electricite, 28 Sep. 1929, vol. 26 pp. 487–497.

Yates, M. A., "Pumps-the Developing Needs", Mar. 31-Apr.-2, 1981, pp. 257–269.

Brand, F. L., "The Thermodynamic Method as a Means of Determining the Flow Through Hydraulic Machines", 1982, North Research and Construction vol. 28e, pp. 10.1–10.3.

Foord, T. R. et al., "New Developments in the Thermometric Method of Measuring Hydraulic Efficiency and Flow", 1964, NEL Report No. 130.

Primary Examiner—William A. Cuchlinski, Jr.
Assistant Examiner—Thomas B. Will
Attorney, Agent, or Firm—Parkhurst & Oliff

[57] ABSTRACT

A method and apparatus for the protection of a hydraulic machine. The difference in temperature across the fluid inlet and the fluid outlet being taken and used to actuate means effectively to signify when the machine is operating outside of its required performance. In a preferred embodiment the temperature difference $\Delta T$ is evaluated from the equation $$\eta_p = \frac{1}{1.0189 - 0.0041\, t_2 + 426.7 \frac{\Delta T}{H}}$$

where the efficiency $\eta p$, the head H in meters and the temperature $t_2$ of the fluid are all known.

4 Claims, 2 Drawing Sheets

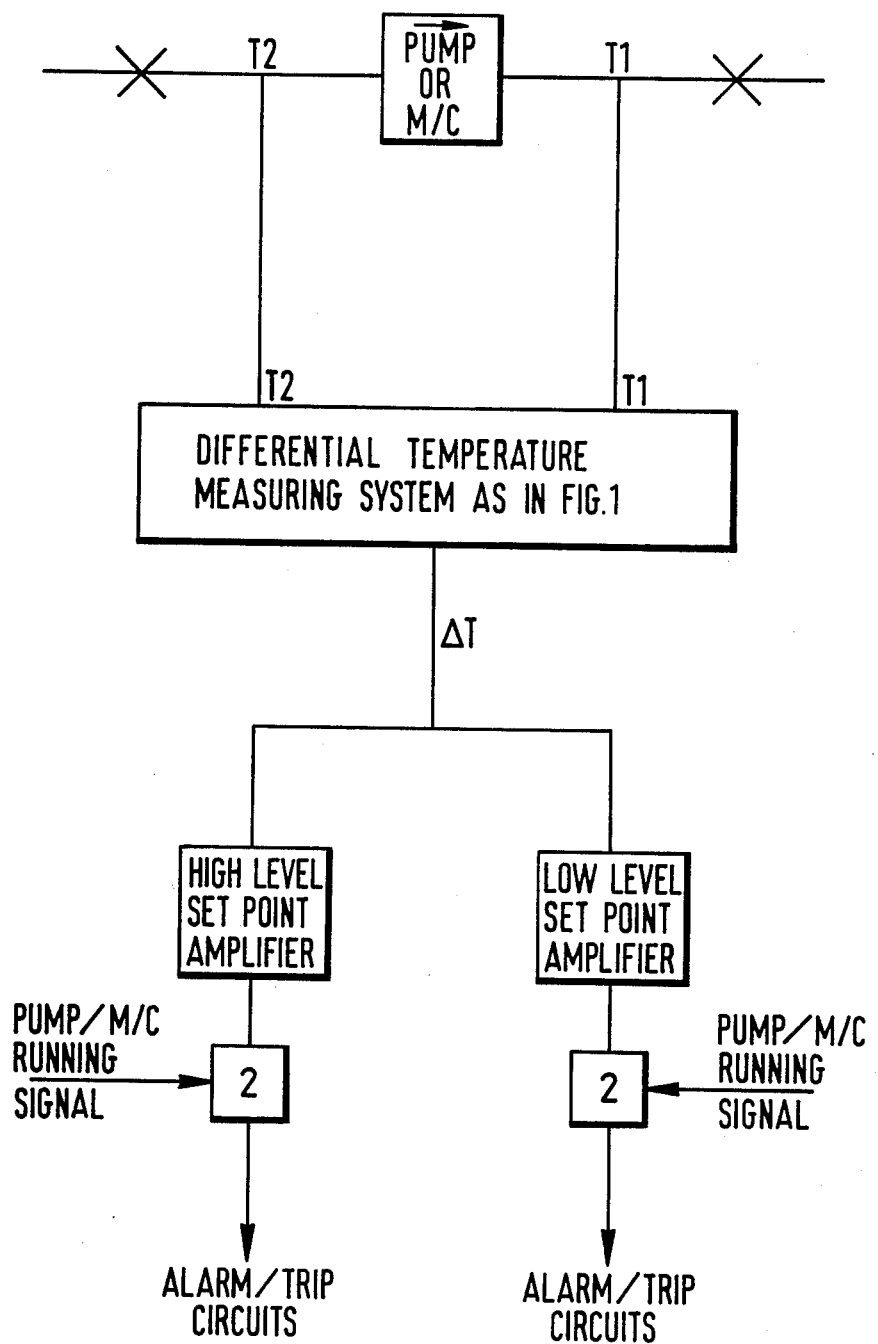

PROTECTION FOR HYDRAULIC MACHINES

This is a continuation of application Ser. No. 716,105 filed Mar. 26, 1985, now abandoned.

This invention relates to protection for hydraulic machines, that is to say protection for pumps, motors, turbines and the like.

Protection is to be understood to mean a safeguard for the hydraulic machine so that it may function according to its design performance limits and not move outside of said limits into malfunction without giving a warning to an engineer in charge of its operation.

It has been known since c. 1914 that the efficiency of a hydraulic machine may be estimated by a determination of the small differences in the fluid temperature between the inlet and the outlet of the machine in relation to the fluid head between said inlet and said outlet.

This is generally expressed mathematically in the convenient form enunciated by: WILLM. G. and CAMPMAS. P. in an article entitled *Efficiency measurements for hydraulic turbines by the Poirson Thermometric method* translated into English in Supplement No. 6/1956 from La Houille Blanche 9 (1954) p449/550, and from BARBILLION. L. *Méthode thermometrique de mesure du rendement des turbines hydrauliques* Revue General del' électricité 26 (1929) p487–497.

The theory of the thermometric or thermodynamic method is as follows:

Efficiency in a hydraulic pump for example may be expressed as $$\frac{\text{Work Done}}{\text{Effort}} \text{ or } \frac{W_o}{W_1}$$

but $W_1 = W_o + \text{Losses}$.

$$\eta_p = \frac{1}{1 + \frac{\text{Losses}}{W_o}}$$

Thus providing one can determine the term $$\frac{\text{Losses}}{W_o},$$

$\eta_p$ may be calculated.

Some of the energy that is lost in pumping may go to drain through gland water or bearing cooling water but the majority of it is dissipated as heat in the pumped fluid. The energy dissipated as heat is defined as where Cp is the Specific heat of the Fluid
Q is the Flow
ΔT is the Temperature rise across the pump
Hence $$\frac{\text{Losses}}{W_o} = \frac{Cp Q \Delta T}{gQH}$$

and therefore $$\eta_p = \frac{1}{1 + \frac{Cp \Delta T}{gH}}$$

an expression that is totally independent of flow.

Taking Cp as 4186 joules per °C. per Kilogram and g as 9.81 meters per second per second, we have $$\eta_p = \frac{1}{1 + 426.7 \frac{\Delta T}{H}}$$

The above equation is simplified as it assumes constant thermodynamic properties for the pumped fluid. The full equation is given by Foord. T. R. et al. *Thermometric Method of Measuring Hydraulic Efficiency.* Water Power. October (1964) p432–434.

$$\eta_p = \frac{V_o(P - P)(1 - \beta) + \tfrac{1}{2}g(V_2^2 - V_1^2) + (Z_2 - Z_1)}{V_o(P_2 - P_1)(1 - a) + jCp_2(t_2 - t_1) + \tfrac{1}{2}g(V_2^2 - V_1^2) + (Z_2 - Z_1)} \quad (1)$$

Where P is pressure; t temperature; V velocity; Z pressure-gauge height; Cp specific heat of water at constant pressure; $V_o$ the specific volume of water at 4° C., 760 mm Hg; J the mechanical equivalent of heat. The suffixes 1 and 2 refer to the inlet and outlet respectively. $\alpha$ and $\beta$ are thermodynamic factors based on the chosen value for $V_o$ and are obtained from published charts. The value of $\alpha$ for water is zero at 4° C. rising to about 0.044 at 15° C. In practice, $\beta$ is usually small and can be neglected.

Under the following conditions the above equation (1) may be simplified while still retaining a high degree of accuracy.

Conditions $$P_2 - P_1 >> \tfrac{1}{2}g(V_2^2 - V_1^2) + (Z_2 - Z_1)$$
$$10° \text{ C.} < t_2 < 50° \text{ C.}$$

Formula (1) becomes $$\eta_p = \frac{1}{1.0189 - 0.0041 t_2 + 426.7 \frac{\Delta T}{H}} \quad (2)$$

If we consider a pump in which:
Q the flow is 400 m³/hr
Head is 100 m
Efficiency $\eta_p$ is 80%
Temperature of fluid is 11° C.

Then from equation (2) above the temperature rise across the pump, ΔT, is 0.065° C., that is 65 millidegrees Celsius.

It is unnecessary with this estimation of efficiency to know the flow characteristics of the machine.

According to the invention therefor, the method for protecting hydraulic machines comprises:

determining a design efficiency for the hydraulic machine to be protected;

determining an unacceptable efficiency for the hydraulic machine to be protected;

calculating first and second temperature differences between a fluid inlet and a fluid outlet of the hydraulic machine according to Formula (2), when the hydraulic machine is operating at the design efficiency and the unacceptable efficiency, respectively;

monitoring fluid temperatures at the fluid inlet and the fluid outlet during operation of the hydraulic machine;

calculating protection values comprising temperature differences between the monitored fluid inlet and fluid outlet; and activating a signal when one of the protection values falls outside of a range between the first and second temperature differences.

I have surprisingly found according to the present invention that for the protection per se of hydraulic machines it is sufficient to take the difference in temperature across the fluid inlet and fluid outlet of the hydraulic machines to obtain a small temperature difference that can effectively actuate means effectively to protect said hydraulic machine. In one embodiment means are provided that are electrically actuated by a temperature difference $\Delta T$ evaluated by the formula $$\eta_P = \frac{1}{1.0189 - 0.0041\, t_2 + 426.7 \frac{\Delta T}{H}}$$

where the efficiency $\eta_p$, the head $H$ in meters and the temperature of the fluid $t_2$ are known.

It is to be understood that an improved flow meter can be obtained by the use of a motor driven pump and the use of the above formula to provide $\eta_p$ by measuring $\Delta T$ since flow in liters per second (Q) is $$Q = k m_p \eta_m \eta_p H$$

where k is a constant $(1000/g) = 102$.
$m_p$ is the motor power to the pump in kilowatts
$\eta_m$ is the efficiency of the motor
$\eta_p$ is the efficiency of the pump and H is the head in meters.

In yet a further embodiment the value of the difference in temperature is divided electrically by the value of the differential pressure of the hydraulic machine to give a non-dimensional term that can give a signal that can be used to protect said machine.

Ideally electrical signals from two probes are electrically subtracted and the resultant signal fed into a micro-processor to evaluate the signal and relate it with the design signal. The signal so produced is then deployed as a protection signal which, depending upon its value, will show when the hydraulic machine is working within the correct limits of its design. The protection signal may sound an alarm or switch off the hydraulic machine once that signal is above or below safe and correct working conditions for the machine.

The invention will be more fully understood from the following description given by way of example only with reference to the figures of the accompanying drawings in which:

FIG. 1 is a circuit diagram of a differential temperature measurement means for a protection device using two terminal integrated circuit temperature transducers; and FIG. 2 is a block diagram of a hydraulic machine protection device.

Referring now to FIG. 1 there is shown:

The two AD590 devices shown are two terminal integrated circuit temperature transducers made by analog devices P.O. Box 280 Norwood, Mass. 02062 United States of America.

These transducers produce an output current proportional to absolute temperature.

For supply voltages between +4 V and +30 V these devices act as a high impedance, constant current regulator passing 1 microamp/degree celsius.

The circuit of FIG. 1 demonstrates one method by which differential temperature measurements can be made.

R1 and R2 are used to trim the operational amplifier to take into account any manufacturing tolerance in the AD590's themselves.

The modus operandi of the circuit is as follows.

T1 responds to the fluid outlet temperature and T2 responds to the fluid inlet temperature of the machine.

The configuration of T1 and T2 shown produces a small current which is a combination of the absolute temperature difference between T1 and T2 and the unavoidable manufacturing tolerances between AD590 (T1) and AD590 (T2).

The manufacturing tolerance is corrected by means of R1 and R2.

The resulting current signal is then converted into a voltage signal by way of the operational amplifier AD741.

The device of FIG. 2 may be employed in the measurement of relative performance of hydraulic machines and related to their overall protection.

Consider the example of a pump as referred to above which is pumping water not at 11° C. but at 4° C., then it generates at a hydraulic head of 100 meters and an efficiency of 80% a temperature rise of 0.058° C.

If a malfunction of this pump is such that the pump now generates a hydraulic head of 200 meters at an efficiency of 40%, then the temperature rise will be 0.0703° C.

Thus while the head has increased by a factor of two and the efficiency has halved the differential temperature has increased by a factor of 12.5.

This amplification effect of the change in running conditions is the basic principle of my pump protection unit.

Such a system may contain a cost penalty feature by the inclusion of pressure signals into the temperature differential and specific heat equation.

The accuracy of the protection device may be improved by incorporating a pressure signal into the device.

For example again using the previous formula with the following pumping conditions:

generated head 100M, efficiency 80%, water temperature 4 degrees, differential temperature 0.058° C.

If the conditions now change such that the head generated is only 50 meters but the differential temperature is unchanged then the efficiency of the pump is 67%.

In this instance a change in pumping conditions has not produced a change in differential temperature measurement.

If, however, we now incorporate the differential pressure signal into the equation such that the differential temperature signal is divided by the differential pressure signal then the following result is achieved.

CASE 1

$$\frac{\text{Differential Temperature}}{\text{Differential Pressure}} = \frac{58}{100} = 0.58$$

CASE 2

$$\frac{\text{Differential Temperature}}{\text{Differential Pressure}} = \frac{58}{50} = 1.16$$

This change in signal is sufficient to operate the control systems.

I claim:

1. A method for protecting a hydraulic machine comprising:
   determining a design efficiency for the hydraulic machine;
   determining an unacceptable efficiency for the hydraulic machine;
   calculating first and second values representative of said design efficiency and said unacceptable efficiency, respectively, said first and second values comprising temperature differences ΔT between a fluid inlet and a fluid outlet of the hydraulic machine when it is operating at said design efficiency and said unacceptable efficiency, respectively, ΔT being evaluated according to a predetermined formula which is premised upon an amplified relationship between efficiency and ΔT as efficiency varies from said design efficiency;
   monitoring fluid temperatures at said fluid inlet and said fluid outlet during operation of the hydraulic machine;
   calculating protection values comprising temperature differences ΔT between said monitored fluid inlet and fluid outlet; and
   activating a signal when one of said protection values falls outside of a range between said first and second values.

2. The method of claim 1, wherein said predetermined formula comprises:

$$\eta P = \frac{1}{1.0189 - 0.0041\, t_2 + 426.7\, \frac{\Delta T}{H}}$$

where $\eta P$ is the efficiency, H is the head in meters, ΔT is the temperature difference between the fluid inlet and the fluid outlet and $t_2$ is the outlet temperature.

3. A method for protecting a hydraulic machine comprising:
   determining a design efficiency for the hydraulic machine;
   determining an unacceptable efficiency for the hydraulic machine;
   calculating first and second values representative of said design efficiency and said unacceptable efficiency, respectively, said first and second values comprising temperature differences ΔT between a fluid inlet and a fluid outlet of the hydraulic machine, divided by differential pressures H across the hydraulic machine, when the hydraulic machine is operating at said design efficiency and said unacceptable efficiency, respectively, ΔT/H being evaluated according to a predetermined formula which is premised upon an amplified relationship between efficiency and ΔT as efficiency varies from said design efficiency;
   monitoring fluid temperatures at said fluid inlet and said fluid outlet, and differential pressures H across the hydraulic machine, during operation of the hydraulic machine;
   calculating protection values comprising temperature differences ΔT between said monitored fluid inlet and fluid outlet, divided by said monitored differential pressures H; and
   activating a signal when one of said protection values falls outside of a range between said first and second values.

4. The method of claim 3, wherein said predetermined formula comprises:

$$\eta P = \frac{1}{1.0189 - 0.0041\, t_2 + 426.7\, \frac{\Delta T}{H}}$$

where $\eta P$ is the efficiency, H is the head in meters, ΔT is the temperature difference between the fluid inlet and the fluid outlet and $t_2$ is the outlet temperature.

* * * * *